United States Patent [19]

Gollwitzer et al.

[11] 3,712,410

[45] Jan. 23, 1973

[54] ACOUSTIC TRANSMITTING TRANSDUCER APPARATUS

[75] Inventors: Lee H. Gollwitzer; Clovis L. LaFleur, both of Houston, Tex.

[73] Assignee: Schlumberger Technology Corporation, New York, N.Y.

[22] Filed: Feb. 11, 1970

[21] Appl. No.: 10,536

[52] U.S. Cl. ............181/0.5 EM, 340/3 A, 340/12 R
[51] Int. Cl. .................................................G01v 1/14
[58] Field of Search ..........181/0.5; 340/12 R, 3 A, 8

[56] References Cited

UNITED STATES PATENTS

| | | | |
|---|---|---|---|
| 3,093,809 | 6/1963 | Watlington | 340/3 A |
| 3,182,285 | 5/1965 | Vogel | 181/0.5 EM |
| 2,852,676 | 9/1958 | Joy | 340/3 A |
| 3,447,127 | 5/1969 | Wiley | 181/0.5 |
| 2,648,056 | 8/1959 | Jakosky | 340/12 R |
| 3,585,405 | 6/1971 | Stettiner | 340/3 A |

*Primary Examiner*—Benjamin A. Borchelt
*Assistant Examiner*—N. Moskowitz
*Attorney*—Ernest R. Archambeau, Jr., John P. Sinnott, Stewart F. Moore, David L. Moseley, Edward M. Roney and William R. Sherman

[57] ABSTRACT

An illustrative embodiment of the present invention includes acoustic transmitting transducer apparatus for use in well borehole logging which provides a sharper, more intense pulse of acoustic energy than heretofore possible while at the same time eliminating undesirable electric fields in the vicinity of the transducer element. Novel circuit means including remote mounted charge storage means, switching means, voltage transforming means and isolation circuitry together with mechanical end clamping are combined to produce this result.

10 Claims, 5 Drawing Figures

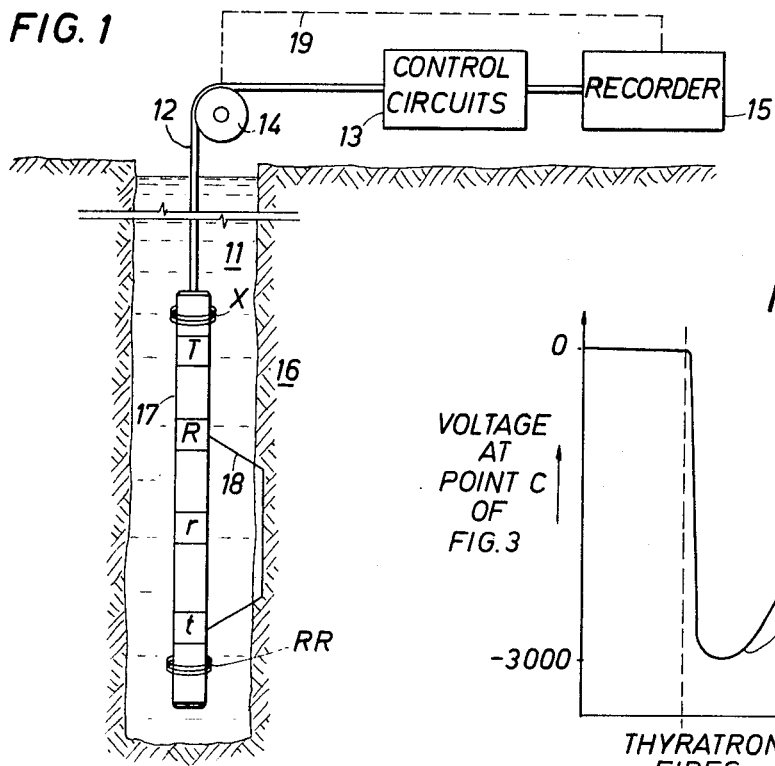
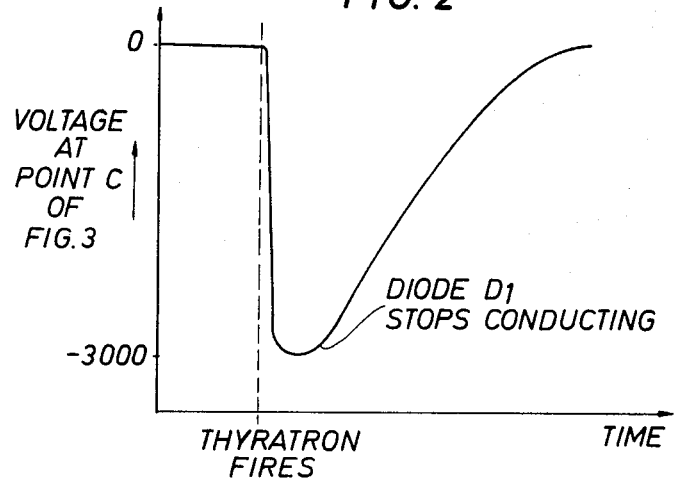
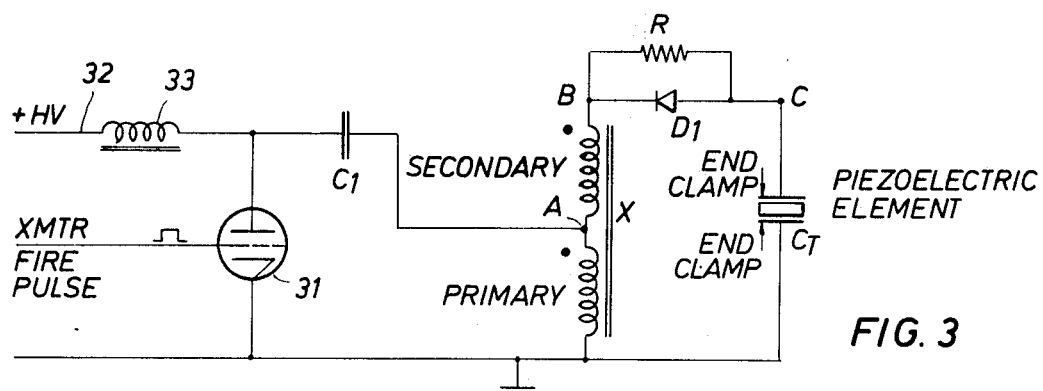
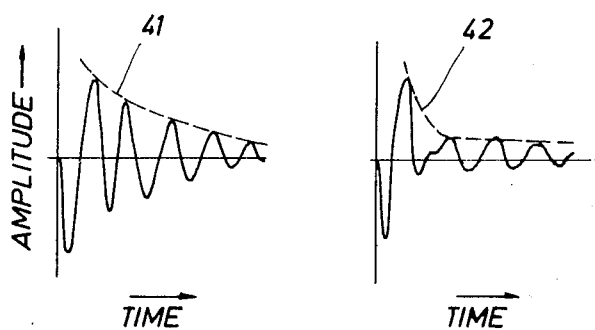

ACOUSTIC TRANSMITTING TRANSDUCER APPARATUS

BACKGROUND OF THE INVENTION

This invention relates to well logging apparatus and more particularly to acoustical transmitting transducer apparatus which is used in conjunction with induction or electrical logging apparatus contained on the same logging sonde.

In modern oil exploration, it has become the usual practice to log well boreholes to determine the characteristics of oil bearing formations beneath the surface of the earth. Generally, the type of logging performed on the formations falls into one of three categories: nuclear logging, electrical logging or sonic logging. Moreover, as well log interpretation techniques have advanced, it has become common practice to have several different types of logs performed simultaneously by the same well logging tool assembly. For example, electrical resistivity and induction logs may be combined on the same tool with a sonic logging instrument.

In electrical resistivity logging, generally, a plurality of electrodes are used and a suitable electronic system is provided for monitoring the voltage at one or more monitor electrodes and for emitting focusing current as well as surveying current into the formation from yet another plurality of electrodes. In electrical induction logging longitudinally spaced coils carried on the central mandrel of the sonde are used to induce secondary electrical current flow in the earth formations surrounding the well bore. Such secondary current flow in the earth formations induces voltages in receiver coils which may also be carried on the central mandrel of the logging sonde.

In either electrical resistivity logging or electrical induction logging it becomes very important to be able to accurately measure electrical fields in the borehole which are the result of current flow in the formations. Difficulties have sometimes arisen in this respect when it is attempted to combine electrical resistivity logging or induction logging tools on the same sonde with a sonic logging tool. In sonic logging, a cylindrical shaped piezoelectric element can be used as the transmitter of acoustic energy into the formation. A strong electrical impulse supplied across such a cylindrical piezoelectric element deforms the element and causes it to oscillate mechanically, thereby producing an acoustic impulse which is transmitted through the formation and borehole fluid to one or more acoustical receiver devices longitudinally spaced from the transmitter on the body of the logging tool. In some applications magnetostrictive sonic transmitting transducers are used and again the sudden discharge of electrical energy through a coil surrounding the magnetostrictive core of such a device causes deformation of the material and generation of an acoustic impulse.

In typical prior art arrangements of acoustical logging transducers it has been a usual practice to utilize the capacitance of a cylindrical piezoelectric element to store an electrical charge upon the exterior and interior surfaces of the element. This charge has typically been supplied by a high voltage power supply circuit. When the inner and outer surfaces of the piezoelectric then are shorted together electrically, a sudden discharge of the stored energy takes place deforming the element and causing the desired mechanical oscillations. It will be readily appreciated that the storing of charge on a large cylindrical piezoelectric acoustic transmitting element will cause large external electric fields about the acoustic transmitting element in the borehole. This is particularly the case since the element must be mounted near the external surface of the logging sonde in order to establish good acoustic contact with the borehole fluid. Such external borehole electric fields can distort and interfere with the measurement of electrical fields due to the small currents induced in the formation in electrical resistivity logging or induction logging.

Another problem which has sometimes arisen in acoustic logging is that of "cross-talk" between the acoustic transmitter and acoustic receivers on the sonde. This is an electrical coupling caused by voltage transients in the transmitter firing circuitry inducing currents in the wiring from the receiver circuitry. It has been found that the cross-talk is worse in cases where the transmitter "rings" or continues to oscillate with relatively large amplitude voltage excursion for several cycles after the initial cycle of oscillation following the firing. Thus, it would be highly desirable to provide an acoustic transmitting transducer with better damping characteristics than have heretofore been achieved.

Accordingly, it is an object of the present invention to provide an acoustic transmitting transducer apparatus which may be used on the same sonde with electrical logging apparatus without interfering with the operation of the electrical logging apparatus.

Another object of the present invention is to provide an acoustic transmitting transducer which delivers a sharper and more energetic acoustical impulse which is free from undesired ringing or oscillation into the formations than has heretofore been possible.

Yet another object of the present invention is to provide an acoustic transmitting transducer with better damping characteristics than have heretofore been achieved.

Yet another object of the present invention is to provide an acoustic logging transducer apparatus which will not produce large external electric fields in the borehole.

In accordance with the objects of the present invention, acoustic transmitting transducer apparatus is provided which produces a better damped and more energetic acoustic impulse than has heretofore been possible and which does not produce large external electric fields in its vicinity in the borehole. This is accomplished through the use of a novel transducer transmitter firing circuit which includes a voltage transformer coupled to a charge storing means which may be controllably discharged across the cylindrical piezoelectric element of the transmitting transducer. Unwanted transducer ringing is reduced by additional damping circuit means and further by mechanically clamping the ends of the cylindrical piezoelectric element under pressure.

The foregoing and other objects, features and advantages of the present invention will become apparent from the following detailed description thereof when taken in conjunction with the accompanying drawings in which:

BRIEF DESCRIPTION OF THE DRAWINGS

FIG. 1 is a schematic illustration showing a well tool incorporating the principles of the present invention suspended in a borehole;

FIG. 2 is a graph illustrating the voltage levels at a point in the circuit of the apparatus of the present invention;

FIG. 3 is a circuit diagram showing the novel transmitting firing circuitry of the present invention; and FIGS. 4a and 4b are graphical representations showing the effects of clamping the ends of the cylindrical transducer element of the present invention under pressure.

DESCRIPTION OF THE PREFERRED EMBODIMENT

Referring initially to FIG. 1, a logging sonde 17 incorporating the principles of the present invention is shown suspended in a fluid-filled well bore 11. The sonde is suspended by a logging cable 12 which supplies power to operate the downhole tool as well as to transmit and receive control signals and logging information from the downhole tool to the surface control circuits 13, shown schematically. A winch arrangement 14 provides motive power for moving the tool through the well bore and is mechanically coupled (as indicated by the dotted line 19) to the recording medium drive apparatus of a recorder 15 to thereby enable a log of electrical and acoustical properties of the earth formations 16 surrounding the well bore to be recorded as a function of the borehole depth of the well logging tool.

The sonde 17, as schematically illustrated, shows the combination of an acoustic travel time logging apparatus comprising two transmitters T and t and two receivers R and r together with an electrical induction log transmitting coil X and induction log receiving coil RR. It will be understood that the sonde housing contains appropriate power and electronic circuit means to provide for operation of the induction and acoustic logging apparatus depicted schematically.

It will be noted that the acoustic transmitting transducers T and t of the sonde 17 are shown mounted in close proximity to the induction transmitting coil X and induction receiving coil RR of the tool in order to provide a shorter length sonde for operation in slanted or deviated well bores. In general, it is a very desirable feature to provide a sonde which is as short as possible for this reason. Although no electrical resistivity logging apparatus is shown on the sonde, it will be appreciated by those skilled in the art that such apparatus comprising a plurality of electrodes on the sonde body or carried on wall engaging pads may also be included in such a combination tool.

In prior art combination tools, a difficulty has sometimes arisen due to the proximity of the acoustic transmitting transducers to the induction receiving coils and/or the resistivity log electrodes which may be carried on the sonde. This difficulty has arisen because of the practice in the prior art of utilizing the capacitance of the acoustic transmitting transducer, which has generally been a cylindrically shaped piezoelectric element, to store an electrical charge which is then short circuited by an appropriate switching means at a desired time. The resultant rapidly changing electrical field across the piezoelectric element produces a mechanical distortion of the element which in turn generates an acoustic impulse which can move from the transmitter through the borehole fluids and longitudinally along the well bore, back through the borehole fluid, to one of the acoustic receivers. A typical path such as just described as illustrated schematically by the ray 18 of FIG. 1.

Using the capacitance of a cylindrical piezoelectric transducer element in this manner to store a charge, of course, produces a strong electric field in the vicinity of the transducer. This electric field can interfere with the measurements at the induction receiving coil RR or with any resistivity electrode probe which may be located in the vicinity of the transmitter. This, of course is an undesirable feature.

Referring now to FIG. 3, a circuit for operation of a sonic transmitting transducer is illustrated which reduces the undesirable effects of using the capacitance of the transducer element to store electrical charge. The circuit of FIG. 3 includes a charge storage capacitor $C_1$ and a transformer X which are used to produce a rapidly varying electric field across the piezoelectric element $C_t$. Moreover, the circuit of FIG. 3 includes a diode $D_1$ and resistor R which comprise a damping network to effectively eliminate unwanted oscillations of the piezoelectric element which, in turn, leads to the production of a sharper acoustic impulse. A cold cathode thyratron 31 or other suitable switching device is utilized to activate the circuit.

The operation of the circuit of FIG. 3 is as follows: a high voltage power supply of conventional design (not shown) supplies a high voltage charge to storage capacitor $C_1$ via the input lead 32. This produces a large positive charge build-up on the capacitor $C_1$ which is housed or located in an appropriately shielded portion interior of the sonde and which may be located remote from the vicinity of the induction receiving coils or resistivity monitoring or focusing electrodes. Thus, the effects of large external fields on the coils, electrodes and earth formations are avoided. When it is desired to fire the acoustic transmitting transducer of the present invention, suitable electronic circuitry (not shown) housed in the tool body provides a transmitter fire pulse through a choke inductor 33 to the grid of thyratron 31 which immediately begins to conduct. As soon as the thyratron 31 begins to conduct, the voltage on the positive charge side of $C_1$ drops to ground potential and the negative side correspondingly drops to minus the value of the high voltage supply, (for example, $-1,500$ volts). Thus, a large negative voltage occurs at point A across the primary of autotransformer X. The choke inductor 33 effectively isolates the high voltage power supply from the firing circuit during the relatively short period that the thyratron 31 is conducting.

When this large negative voltage ($-1,500$ volts) suddenly appears across the primary of the autotransformer X, a corresponding voltage is induced in the secondary winding of the transformer. So in this example, about $-3,000$ volts (depending on the transformer primary to secondary turns ratio) appears at point B of the circuit of FIG. 3. This causes the diode $D_1$ to conduct producing a large negative voltage at point C of the circuit of FIG. 3 across the piezoelectric transducer element $C_t$. This voltage is shown as a function of time in FIG. 2. The sudden application of a large voltage across the piezoelectric element deforms the element because of its piezoelectric nature and causes it to mechanically vibrate, generating an impulse of acoustic energy which is coupled into the borehole fluid surrounding the logging sonde. Although an autotransformer X is illustrated in FIG. 3, it will be appreciated by those skilled in the art that a conventional two winding transformer could be used if desired. The autotransformer is, however, a preferred choice here since it occupies less space in the sonde.

When the voltage at point C of the circuit reaches its maximum negative value as shown in FIG. 2 and begins to decrease toward ground potential, the diode $D_1$ ceases conduction and the voltage across the piezoelectric element $C_t$ will decrease to zero at a rate depending on the time constant $RC_t$ of the circuit formed by the resistor R and the capacitance $C_t$ of the piezoelectric element. The time constant $RC_t$ is preferably made long with respect to the natural period of oscillation of the transducer element circuit. Since the diode $D_1$ ceases conduction the piezoelectric element is effectively electrically isolated at this time from the autotransformer X. This has the desirable effect that it prevents an oscillatory circuit consisting of the capacitance of the piezoelectric element $C_t$ and the inductance L of the autotransformer X from being formed. The formation of such an oscillatory circuit could lead to unwanted ringing or continued oscillation of the piezoelectric element which could continue to oscillate for several cycles in an undesirable manner. Thus, a sharper, more intense acoustic impulse is generated by the transmitting transducer because of this isolation effect. This also reduces the effects of cross-talk as previously discussed.

It has additionally been found that the sharpness of the acoustical impulse produced by the transmitting transducer can be enhanced by mechanically applying pressure to the ends of the cylindrical piezoelectric transducer element in a direction indicated by the arrows of FIG. 3. The mechanical means for doing this are not specifically illustrated since such a construction is quite obvious. The results of such end clamping are illustrated in FIGS. 4a and 4b. It will be noted in FIG. 4a that before end clamping is applied to the transducer element that the damping rate (as illustrated by the envelope curve 41 of FIG. 4a) decreases at a much slower rate than the envelope curve 42 of FIG. 4b which results after the end clamping of the transducers. This is a highly desirable feature as the signal-to-noise ratio of the system is much enhanced if the energy is provided in a sharper pulse. Since the same total amount of energy is available in the circuit, if this energy is all confined to the first cycle of oscillation of the transducer, a more intense acoustic impulse will be produced than if this same amount of energy is spread out over several cycles of oscillation of the transducer as in FIG. 4a. This also improves the resistance of the circuit to the cross-talk problem. A typical clamping pressure which has been found to be desirable for this purpose is about 20 PSI.

While a specific embodiment of the present invention has been shown and discussed, it may be apparent to those skilled in the art that changes and modifications may be made without departing from the true spirit and scope of the present invention. Accordingly, it is the aim of the appended claims to cover all such changes and modifications which come within the scope of this invention.

We claim:

1. Apparatus for generating acoustic energy in a well borehole comprising:

an acoustic transducer element having two terminal connections;

voltage transforming means having a primary and a secondary, the secondary being connected across the terminal connections of said transducer element;

electrical energy storage means coupled to said primary of said voltage transforming means;

means for discharging said energy storage means through said voltage transforming means thereby to apply high voltage across the transducer element; and means electrically coupled between said transducer element and said voltage transforming means for damping oscillations following the application of the high voltage across said transducer element.

2. The apparatus of claim 1 wherein said transducer element comprises a piezoelectric element.

3. The apparatus of claim 1 wherein said damping means comprises a unidirectional current conduction device.

4. The apparatus of claim 3 wherein said damping means further includes resistance means for damping the oscillations of said transducer element induced by the discharge of said energy storage means.

5. The apparatus of claim 1 wherein said voltage transforming means comprises an autotransformer.

6. The apparatus of claim 2 further including means for applying mechanical pressure against the ends of said piezoelectric element to increase the damping rate thereof.

7. Apparatus for generating acoustic energy in a well borehole comprising:

a cylindrical piezoelectric transducer element having two terminal connections and mounted with its ends clamped under a mechanical pressure;

voltage transforming means having a primary and a secondary, the secondary being connected across the terminals of said transducer element;

capacitive electrical storage means coupled to said primary of said voltage transforming means, means for discharging said energy storage means through said voltage transforming means thereby to apply a high voltage across the transducer element; and means electrically coupled between said transducer element and said voltage transforming means for damping oscillations following the application of the high voltage across said transducer element.

8. The apparatus of claim 7 wherein said damping means includes resistance means for damping the oscillations of said transducer element induced by the discharge of said energy storage means.

9. Apparatus for generating acoustic energy in a well bore comprising:

an acoustic transducer element having two terminal connections;

voltage transforming means having a primary and a secondary, the secondary being connected across the terminal connections of said transducer element;

electrical energy storage means coupled to said primary of said voltage transforming means for supplying, upon discharge, electrical energy to said voltage transforming means thereby to apply a high voltage across said transducer element; and means electrically coupled between said transducer element and said voltage transforming means for damping oscillations after the application of the voltage across said transducer element.

10. Borehole logging apparatus comprising:

a housing sized for passage in a well bore;

acoustic transducer means disposed intermediate the length of said housing and operative to transmit and receive acoustic energy;

circuit means for energizing a transducer means to emit an acoustic impulse and including high voltage capacitive means;

electrical logging means disposed above and below said acoustic transducer means on said housing for emitting and detecting electrical energy; and said capacitive means being disposed in said housing and remotely positioned relative to said impulse emitting transducer means, thereby to electrically shield the electrical charge on said capacitive means relative to said electrical logging means.

* * * * *